United States Patent [19]

Nash et al.

[11] Patent Number: 4,457,682

[45] **Date of Patent: * Jul. 3, 1984**

[54] MACHINE FOR CASTING CONCRETE MEMBERS

[75] Inventors: Richard C. Nash, New Prague; David W. Hanson, Golden Valley; Richard R. Hoehn, Prior Lake, all of Minn.

[73] Assignee: Fabcon, Inc., Savage, Minn.

[ * ] Notice: The portion of the term of this patent subsequent to Jan. 18, 2000 has been disclaimed.

[21] Appl. No.: 458,016

[22] Filed: Jan. 14, 1983

Related U.S. Application Data

[62] Division of Ser. No. 257,781, Apr. 27, 1981, Pat. No. 4,369,153.

[51] Int. Cl.[3] .................. B29C 11/00

[52] U.S. Cl. .................. 425/219; 264/293; 425/62; 425/64; 425/120; 425/224; 425/456

[58] Field of Search .................. 425/62, 64, 120, 219, 425/224, 257, 261, 462, 456, 218, 220, 458, 465; 264/70, 71, 293

[56] References Cited

U.S. PATENT DOCUMENTS 2,270,541 1/1942 Martin .................. 264/293

3,109,193 11/1963 Erickson .................. 425/45 S 3,217,375 11/1965 Kinnard .................. 425/130

4,131,670 12/1978 Abate .................. 425/64

4,186,166 1/1980 Hight, Jr. .................. 264/70

4,280,800 7/1981 Bunn .................. 425/62

*Primary Examiner*—Donald E. Czaja
*Assistant Examiner*—Mary A. Becker
*Attorney, Agent, or Firm*—Schroeder, Siegfried, Vidas & Arrett

[57] ABSTRACT

A machine for casting concrete panels. The machine disclosed casts hollow core concrete panels in a single casting operation utilizing a slipform technique to fill cores with core material which can be dumped from the core after curing of the concrete has been accomplished. Vibration of the slipform during casting facilitates free flow of concrete around the slipform and core material extruded from slipforms. The slipfom has a closed front portion which is tapered to a reduced cross section. The machine utilizes a casting pallet employing improved side form cleaning apparatus. The machine also includes improved finishing screeds for applying decorative three-dimensional finishes on the top surface of cast panels.

2 Claims, 20 Drawing Figures

280
194
188
276
272
274
270
277
182
266
174
271
269
264
275
134
58
52
56
258
254
256
250
122
48
132
230
220
50
128
228
130
60
54
6
7
120
126
186

220
222
224
226
228
230
232
128
13
14

MACHINE FOR CASTING CONCRETE MEMBERS

This is a division of application Ser. No. 257,781, filed Apr. 27, 1981 which became U.S. Pat. No. 4,369,153, issued Jan. 18, 1983.

DESCRIPTION

Background of the Invention

This invention relates to a machine for casting concrete panels in a single pass casting operation utilizing slipforms to fill core areas within the panel with core material which can be dumped from the cores after preliminary curing of the panel. Apparatus such as that described in U.S. Pat. No. 3,217,375 shows a system for forming concrete planks or slabs utilizing slipforms to form planks or slabs having cores filled with vermiculite or some similar lightweight material. The patent discloses the use of the apparatus to form concrete planks or slabs in a two-step casting process. A first concrete layer of dry concrete having substantially zero slump is first deposited on a casting bed by a bottom casting machine and rolled and compacted utilizing rollers.

The top casting machine disclosed in U.S. Pat. No. 3,217,375 utilizes an open bottom slipform to extrude what is described in the patent as lightweight core material into the central core of concrete planks or slabs while formation of the plank is completed by distributing wet concrete having a slump exceeding five inches over the slipform. In order to assure proper operation of the machine, the patent indicates that it is necessary for the sidewalls of the open slipforms to cut into the bottom layer of dry concrete to a depth of approximately one-quarter inch. Although U.S. Pat. No. 3,217,375 as issued discloses only casting machines which move along a casting bed which is resting on the ground, the parent applications of that patent identified as Ser. No. 129,214, filed Aug. 2, 1961, and Ser. No. 50,351, filed Aug. 18, 1960, and later abandoned, both disclosed as a preferred embodiment a single pass casting machine which is stationary relative to the ground and a casting bed which is longitudinally movable relative to the casting machine and the ground. Similar arrangements for moving a casting bed relative to stationary casting apparatus are also shown in U.S. Pat. No. 1,891,626 to Mortimer, U.S. Pat. No. 2,655,708 to Eschenbrenner, U.S. Pat. No. 2,039,204 to Young and in numerous other patents showing the movement of casting beds or their equivalent past a manufacturing machine such as a casting machine.

U.S. Pat. No. 3,523,343 discloses a moving casting bed system for producing hollow core concrete members using equipment as shown in U.S. Pat. No. 3,217,375 utilizing a first casting pass in one direction to form the lower layer of concrete and a second casting pass in the reverse direction to form the top layer of concrete. Such an arrangement when utilized to cast extremely long beds of concrete members can result in undesirable effects, especially when the bottom and top layers are formed from "wet" concrete, because of the curing which occurs in the bottom layer between the time when it is cast and the time that the top layer is cast over it. In the two pass system shown in Mitchell, the bottom layer of concrete which is first deposited does not receive the top layer of concrete until the completion of the casting pass for the bottom layer. The portion of the bottom layer cast just before the direction of the casting bed is reversed receives the top layer when the most recently cast portion of the bottom layer has barely begun to cure. This range in the partial curing time of the bottom layer before the top layer is cast can result in poor bonding between the bottom and top layers. Some apparatus is in use which resembles that in U.S. Pat. No. 3,523,343, but modified to cast the bottom and top layers with the casting bed moving in the same direction, contrary to the teachings of that patent. Even the modified manufacturing apparatus has operating deficiencies because of the criticality of the bond between the lower level of concrete and the upper level when the two layers are cast in separate operations.

SUMMARY OF THE INVENTION

The present invention provides a "single pass" casting machine for the manufacture of hollow core reinforced concrete panels or planks. A slipform is used to form a filled core in the plank. Forming the plank or panel in a single casting pass assures a stronger, more reliable product than is available using two cast pass prior art machines which require a bond to be made between a lower concrete layer which must be poured initially and a top concrete layer of concrete and core forming material which must be bonded to the previously poured lower layer. In addition, the present invention allows more accurate control of all of the steps of the manufacturing operation to provide a more uniform product economically.

DETAILED DESCRIPTION

Figure 1A:
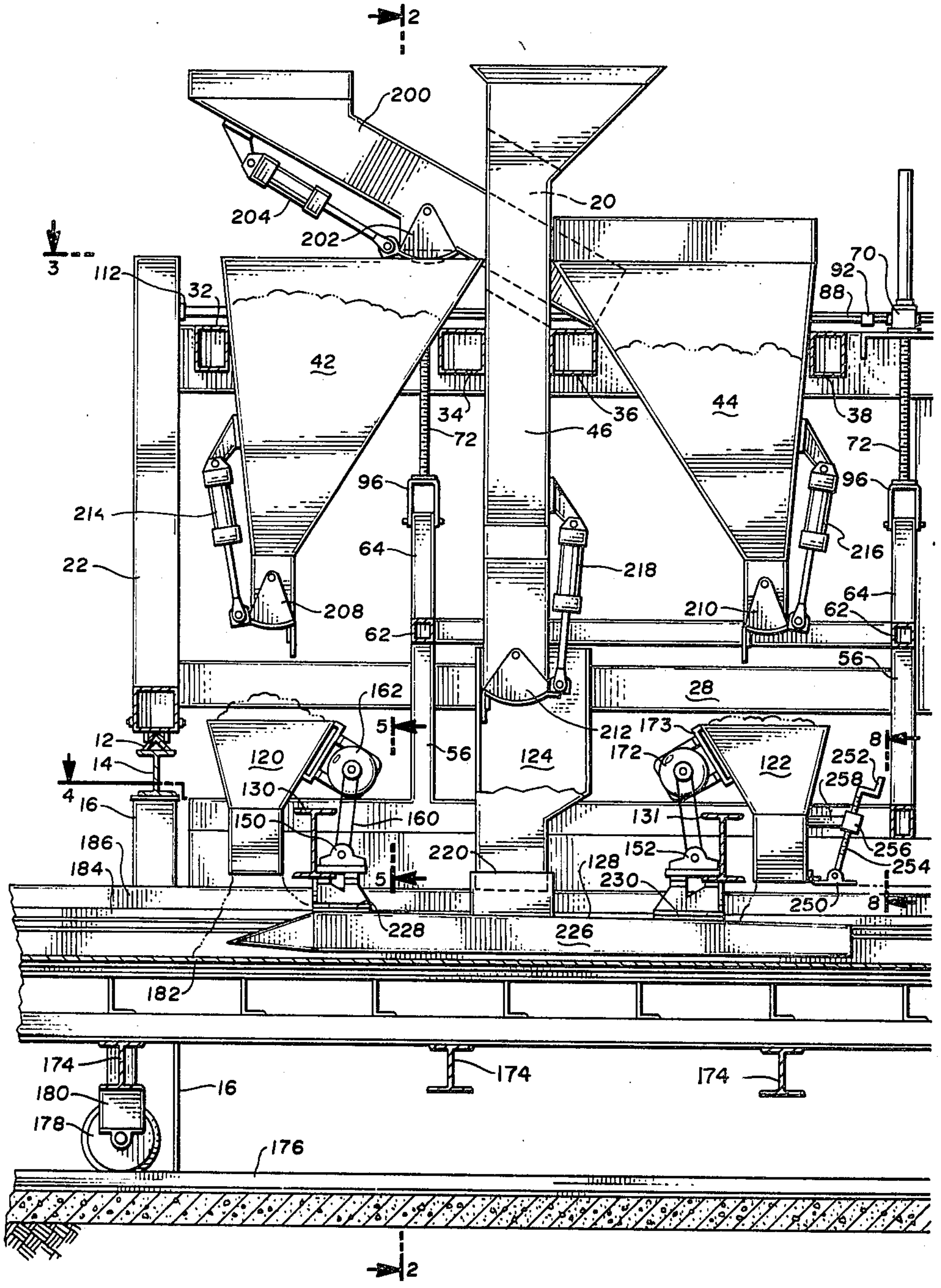
FIGS. 1A and 1B are a left side elevational view of a casting machine in accordance with the present invention.
Figure 1B:
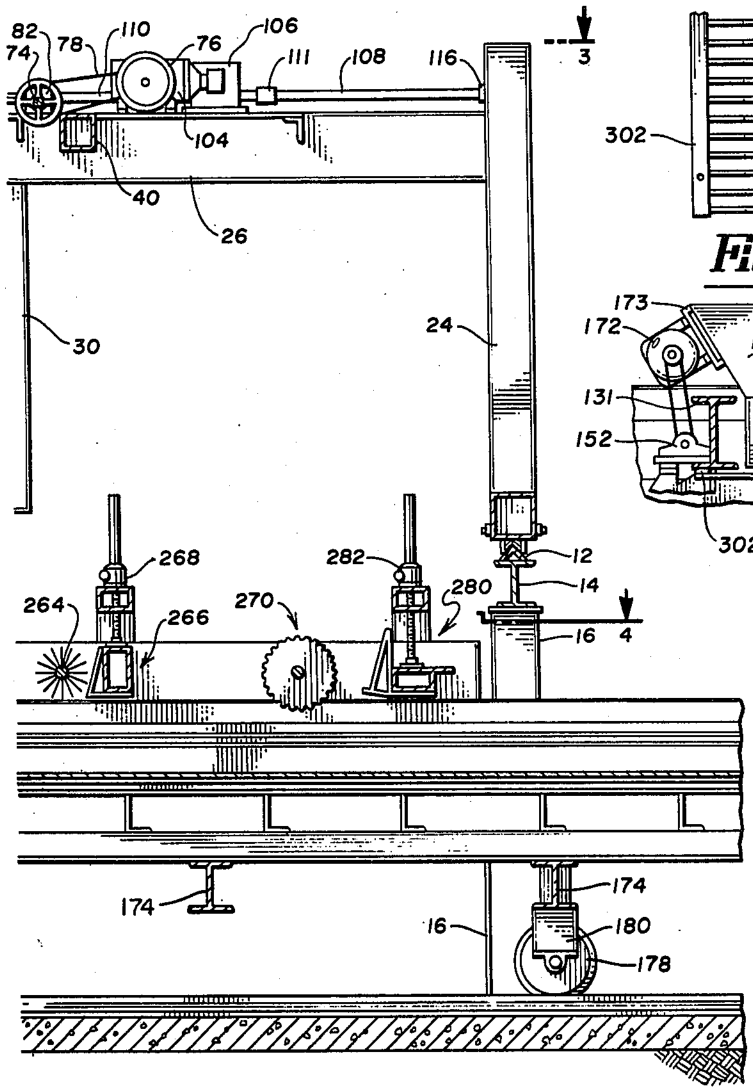
Figure 2:
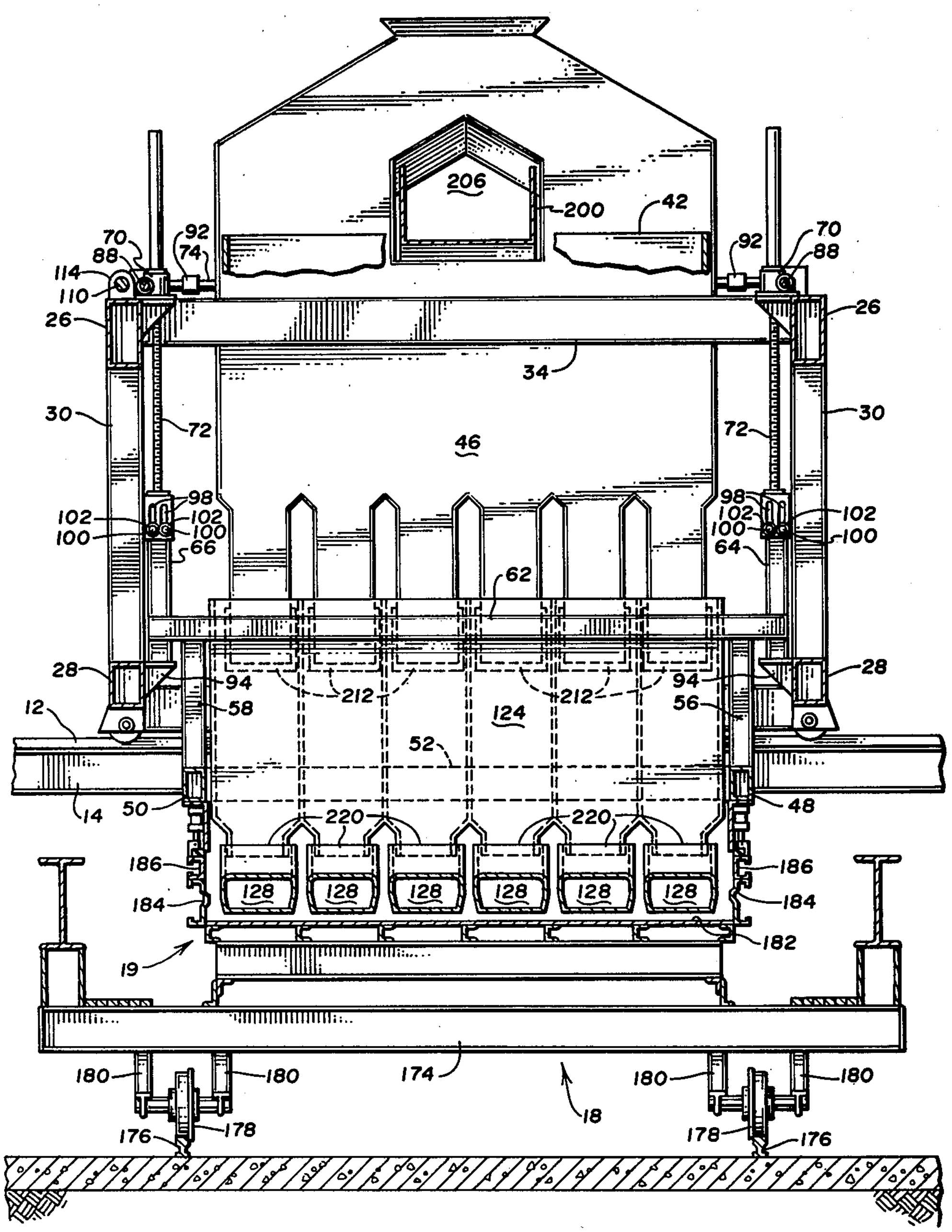
FIG. 2 is a sectional elevational view taken on lines 2—2 of FIG. 1A.

Referring initially to FIGS. 1A and 1B and FIG. 2, the overall layout of the improved casting machine and its related equipment which embody the present invention is shown in side view. Since the machine is capable of being utilized with one of several parallel casting beds, the equipment shown is movable transversely between the casting beds on a set of transverse rails 12 which are mounted on I beams 14 and supporting pillars 16, which are positioned adjacent the casting beds to permit longitudinal movement of the casting beds.

The movable frame for the hoppers and casting machine is comprised of vertical support members 22 and 24, which are respectively the front and rear supports. A horizontal top support beam 26 is connected to a horizontal lower support beam 28 by vertical support 22 and an additional vertical support 30. Transverse beams 32, 34, 36, 38 and 40 are connected between the top horizontal support beams 26 to provide stiffening and support for other elements in the machine.

Beams 32 and 34 support a forward concrete bin 42 while beams 36 and 38 support a rear concrete bin 44. A core material bin 46 is supported between transverse beams 34 and 36 as shown.

Figure 4:
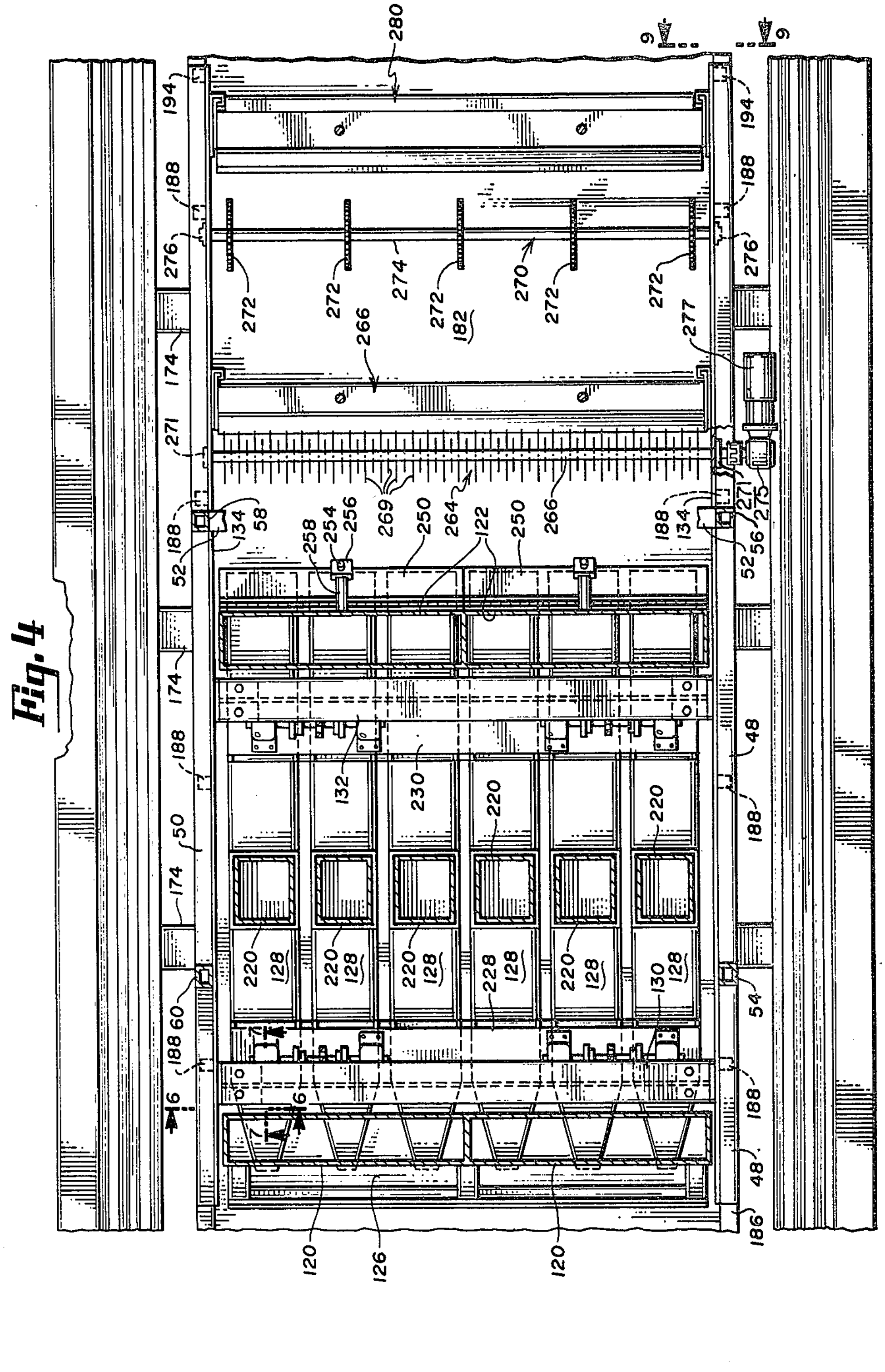
FIG. 4 is a sectional plan view taken at lines 4—4 of FIGS. 1A and 1B.

As can be best seen in FIGS. 2 and 4, a casting machine frame comprised of side beams 48 and 50 and a rear transverse beam or tube 52 is supported by four vertical beams or tubes 54, 56, 58 and 60. Vertical supports 54, 56, 58 and 60 are connected to front and rear transverse supports 62 which are, in turn, connected to short vertical tubes 64 and 66.

Figure 3:
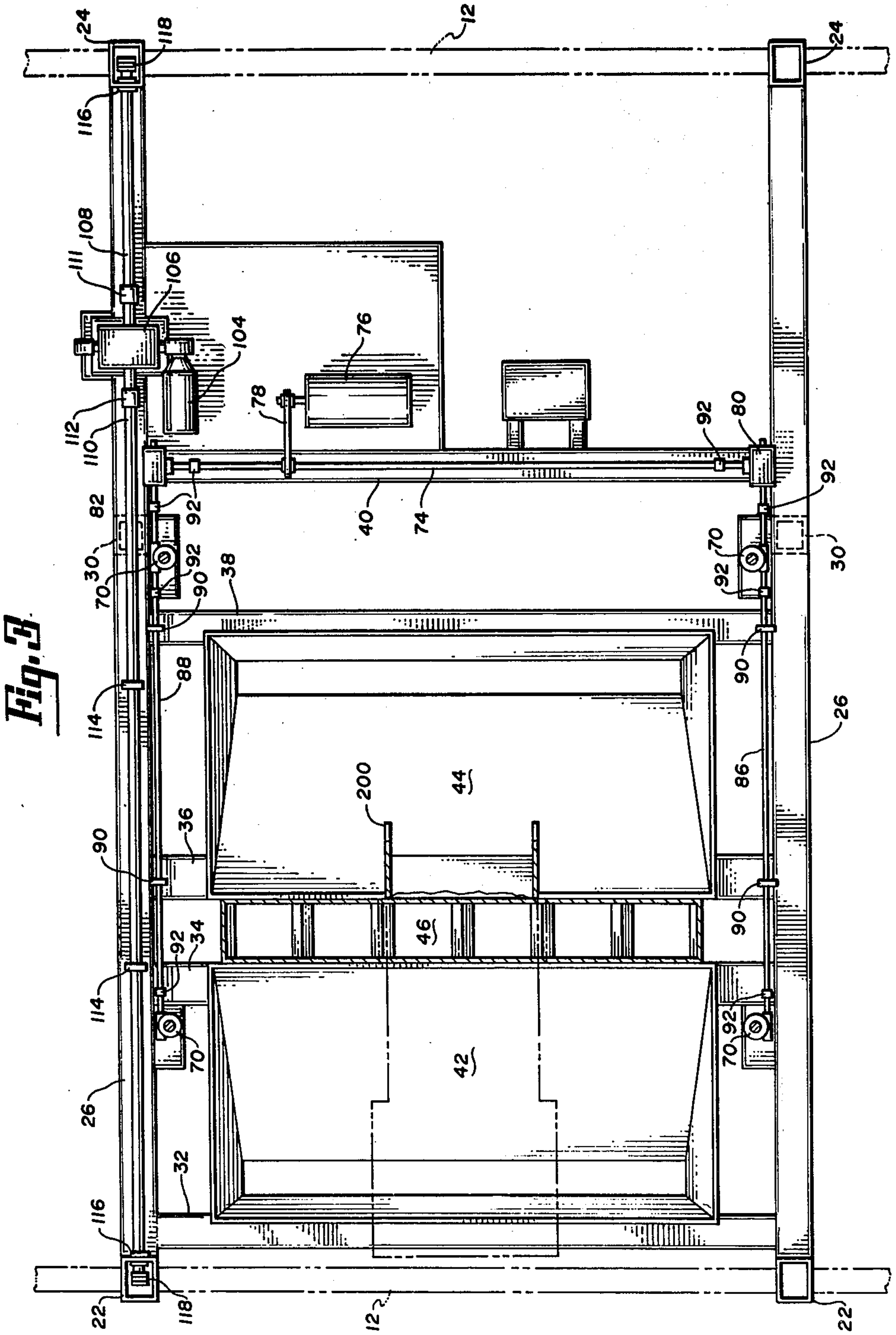
FIG. 3 is a sectional plan view with background detail omitted for clarity of illustration taken on lines 3—3 of FIGS. 1A and 1B.

The casting machine frame comprised of beams 48, 50 and 52 is raised and lowered by jack screws 70, which are connected to the upright frame portions 64 and 66 as shown in FIGS. 1A, 2 and 3. The jack screws are operated by a primary drive shaft 74, which best can be seen in FIG. 2, which is in turn driven by a motor 76 through a timing belt system 78. Shaft 74 drives right angle miter boxes 80 and 82, which in turn drive shafts 86 and 88 to power jack screws 70. Shafts 86 and 88 are supported by appropriate pillow block bearings 90, and shafts 74, 86 and 88 are connected to jack screws and miter boxes by a suitable flexible couplings 92 as shown. Thus, it can be seen that operation of motor 76 in one direction serves to advance all four jack screws 70 to apply an upward force to lift the casting frame while maintaining it in parallel alignment to the plane of pallet 19. Rotation of motor 76 in the opposite direction lowers the casting frame until contact is made between the frame 62 and the blocks 94 attached to vertical beams 30 as shown in FIG. 2. Appropriate shims can be placed on top of the blocks 94 to alter the height at which the downward vertical movement of the frame is stopped. In order to keep the shafts 72 from driving the frame against the stops or blocks 94, the vertical movement of the shafts in a downward direction is decoupled when the frame reaches the stops 94 by the slide system best seen in FIG. 2.

As shown in FIGS. 1A and 1B and 2, each of the jack screw shafts 72 is connected for rotary movement relative to a clevis 96, which has a plurality of slots 98 on each arm. Beams 64 and 66 are connected to the clevis utilizing bolts 100 which project through the entire clevis and are slidably secured using suitable securing means or nuts 102 to permit limited movement of the beam 64 along the axis of shaft 72. Thus, when the jack screw has lowered the frame to the point where it makes contact with the stop 94, further downward movement of the jack screw results only in movement of the clevis 96 relative to beam 64 without applying further downward force to beam 64. This "lost motion" connection of the jack screws to the casting machine frame is an improvement over the rigidly connected jack screw arrangement shown in FIG. 1B of U.S. Pat. No. 3,523,343. The operator, when he notes that the frame has reached the stops, removes the drive to motor 76 to stop further rotation of jack screws 70. The motor controls are conventional and not explicitly shown herein.

The motor and jack screw system lifts the entire casting machine frame to clear pallet 19 and casting bed 18 and permit movement of the support frame between adjacent casting beds. Transverse movement of the support frame is accomplished by a suitable motor 104, shown in FIG. 3, which drives a worm gear reducer 106, which in turn drives shafts 108 and 110 through appropriate flexible couplings 111 and 112 respectively. The shaft 110 is supported by appropriate pillow block bearings 114 and flange bearings 116 and terminates in wheels 118, which are driven by motor 104 to propel the entire support frame between casting beds after the casting machine frame has been fully raised by motor 76 to clear the pallet 19 and side forms of the casting beds.

The machine frame has mounted on it a foward concrete bin 120 and a rear concrete bin 122, as well as a core material bin 124. Bins 120, 122 and 124 are all constructed for vertical movement with the machine frame relative to hoppers or bins 42, 44 and 46. An extruder or slipformer 128 is suspended from slipform support beams 130 and 131, which are in turn suspended from the casting machine frame.

Figure 5:
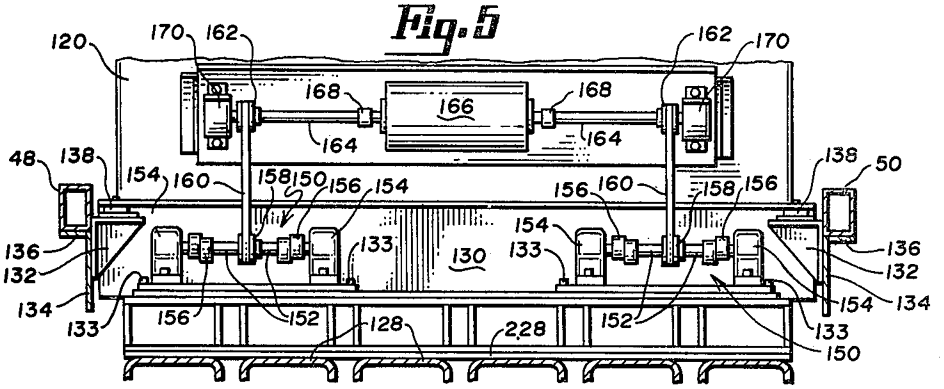
FIG. 5 is a sectional elevational view with an auxiliary angle taken at lines 5—5 of FIG. 1.
Figure 6:
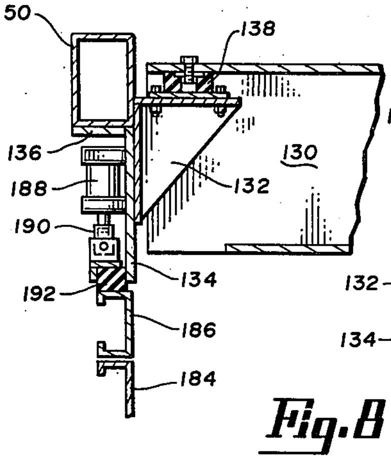
FIG. 6 is a sectional detail view in elevation and enlarged scale taken at lines 6—6 of FIG. 4.
Figure 7:
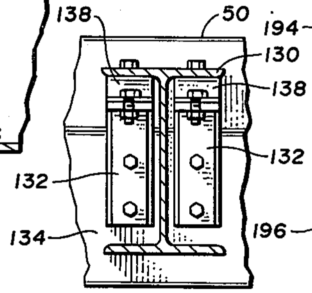
FIG. 7 is a sectional detail view in elevation and enlarged scale taken at lines 7—7 of FIG. 4.

The connection of beams 130 to the casting machine frame is shown in detail in FIGS. 5 through 7. As shown in FIGS. 5 and 6, beam 130 is shown connected to support beams 50 and 52. A bracket 132 is connected to a slide 134, which has an upper flange portion 136 attached to the underside of beam 48 or 50. Bracket 132 is bolted to slide 134 and has an anti-vibration isolator 138 connected between its upper surface and the lower inside surface of beam 130. In one embodiment of the machine, the anti-vibration isolator 138 is a commercially available Barry Model 670-15 anti-vibration isolator. Anti-vibration isolators are connected between both ends of beams 130 and 132, and the support frame to provide complete vibration isolation between the casting machine support frame and slipform support beams 130 and 132 so that the slipforms can be vibrated to facilitate operation of the casting machine without vibrating the casting pallet 19 and bed 18.

Figure 8:
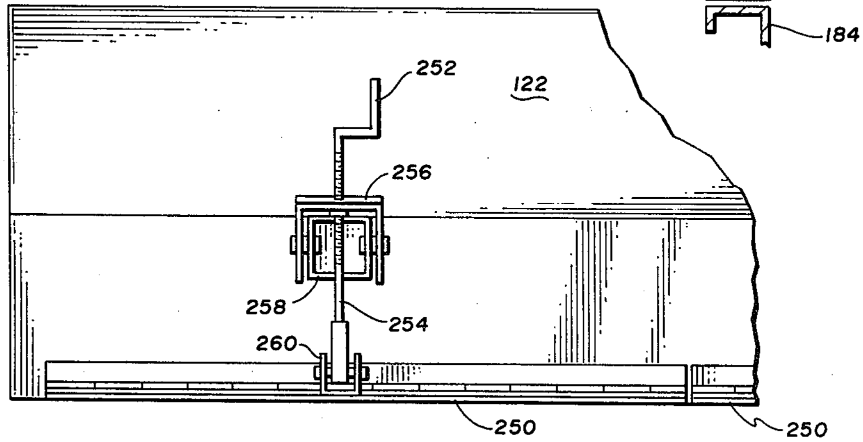
FIG. 8 is a partial detail view in elevation and enlarged scale taken at lines 8—8 of FIG. 1A.

In FIG. 5, the details of the vibration producing system are shown. Beam 130 has a pair of vibrators 150 mounted thereon. Each vibrator is comprised of a shaft 152 supported by a suitable pair of roller bearing pillow blocks 154. Several eccentric weights 156 are mounted on each shaft 152, and the shaft is driven by a suitable pulley 158 which is connected by a belt 160 to a pulley 162 mounted on a shaft 164 driven by a motor 166. Motor 166 is coupled to shaft 164 through flexible couplings 168, and the shafts are supported by roller bearing pillow blocks 170 at their far ends. Similar vibrators 150 are also attached to beam 132, as shown in FIG. 1, and driven by a motor 172 mounted on a support plate 173, which is connected to the rear concrete bin 122. This isolated vibration system is a substantial improvement over the vibration arrangement shown in U.S. Pat. No. 3,217,375 in FIGS. 8 and 9 where the casting machine support beams are not isolated from the remainder of the frame.

FIGS. 1A and 1B and 2 also show the detail of how the casting frame is supported above the pallet 19 and casting bed 18. The bed 18 is movable along tracks 176 on flanged wheels 178, which are journalled for movement on supports 180. On the casting bed 186, there is a pallet 19 upon which the concrete slab is cast. Side forms 184 define the side walls of the casting mold of which the surface 182 of pallet 19 forms the bottom. A further side form section 186 rides upon the side form 184. The side form and casting bed are movable at a fixed height along the rails 176 so that as the casting bed 174 passes beneath the casting machine, there is no change in the vertical elevation of the pallet surface 182. Since, in any physical system, there is likely to be some variation in the height of pallet surface over the length of the bed, the slide 134 is maintained at a fixed distance above the top of the side form 186 by means of the contact arrangement as shown in FIG. 6. At intervals along slide 134, there are placed air cylinders 188 which have an output shaft 190 connected to a rubber contact strip 192 which runs the length of the machine frame. The air cylinders and rubber provide a sliding contact between the top of the side forms and the casting frame, which provides some adjustability of the casting machine height to compensate for slight variations in the height of the pallet surface 182 as bed 18 moves along beneath the casting machine. The bed drive can be provided by a number of methods including the use of drive wheels bearing directly on bed 18 itself or a longitudinal beam (not shown) attached to its lower surface. A drive system as shown in U.S. Pat. No. 3,523,343 could also be used.

Figure 9:
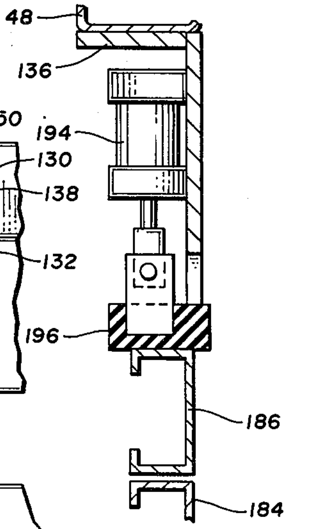
FIG. 9 is a sectional detail view in elevation and enlarged scale taken at lines 9—9 of FIG. 4.

FIG. 9 shows the detail of the means which are provided on the casting frame to clean the top surface of the side form and prevent the build-up of concrete which would interfere with operation of the mechanism shown in FIG. 6. An air cylinder 194 urges a rubber scraper 196 into contact with the top surface of side form 186. The scraper removes the wet concrete from the upper surface of the side form in the vicinity of the rear of the casting apparatus just after the concrete has been deposited on the pallet and before the concrete has hardened. This has been found to be more effective than the use of sealing plates as shown in FIG. 7 of U.S. Pat. No. 3,217,375 to keep the upper surface of the side forms free of concrete.

A concrete delivery chute 200 is also shown in FIG. 1A. The concrete chute 200 receives a supply of concrete from a conventional overhead conveyor system or other suitable source of concrete. Chute 200 is in communication with both the front concrete bin 42 and the rear concrete bin 44. In operation, the clam shell 202 is opened by actuator 204 to fill the front concrete bin 42. After concrete bin 42 is filled, actuator 204 closes clam shell 202 and the concrete moving through chute 200 then fills the rear bin 44. The core material bin 46 is filled with rock or any other suitable core material by a conventional conveyor or any other suitable means. As shown in FIG. 2, an opening 206 is provided through hopper 46 to permit chute 200 to communicate with bins 42 and 44. Bins 42, 44 and 46 are all provided with clam shell gates 208, 210 and 212 respectively, which are actuated respectively by actuators 214, 216 and 218 respectively, whose conventional control circuitry is not shown. Actuators 204, 214, 216 and 218 are all operated under the control of an operator who observes the operation of the machines and keeps bins 120, 122 and 124 full as the machine is operated. They may also be operated automatically utilizing known sensor and control technology.

As the machine is operated and the casting bed is moved from right to left as viewed in FIGS. 1A and 1B, the extruder 128 moves through the concrete deposited from hopper 120 and commences the initial forming of voids in the product being formed on the casting bed.

Figure 10:
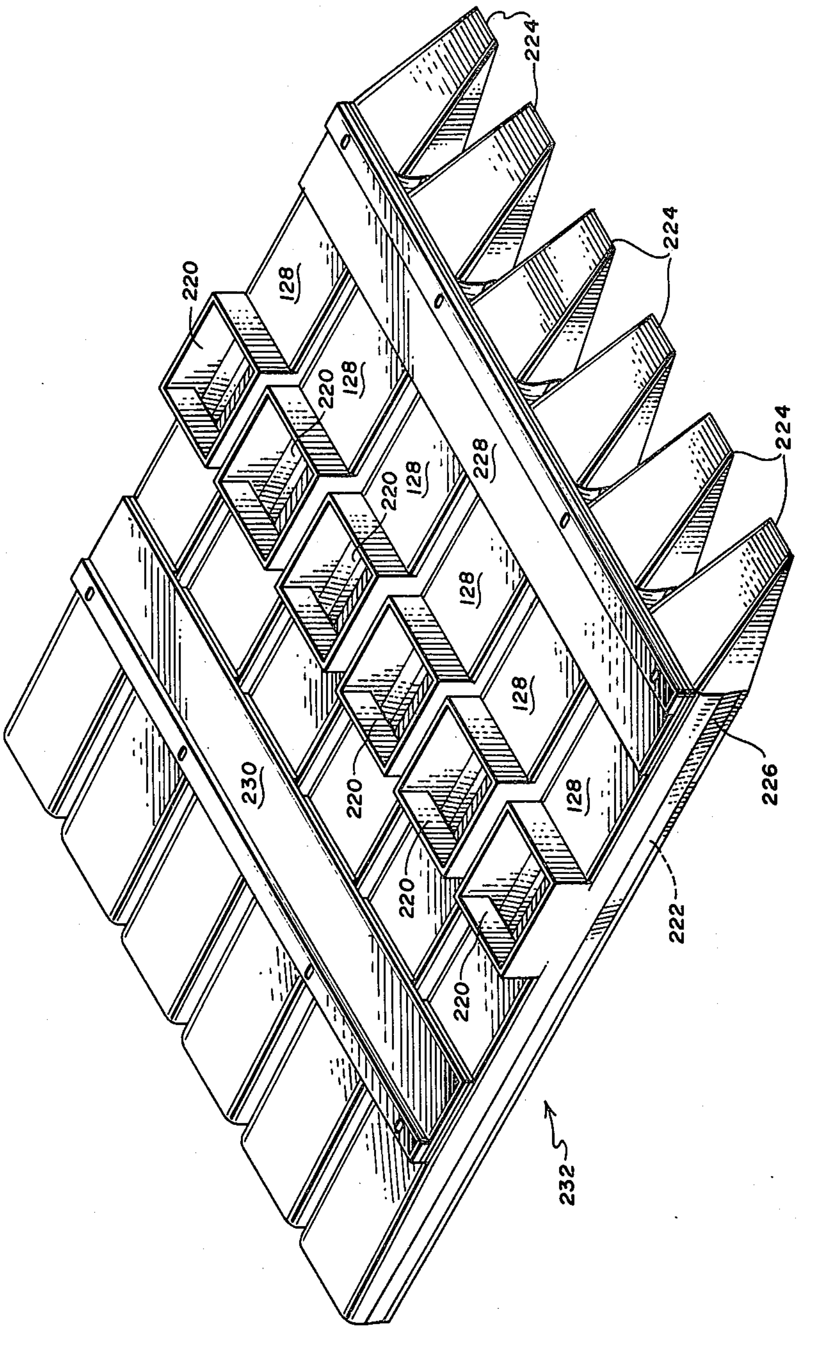
FIG. 10 is an isometric pictorial view of core forming elements as used in the casting machine of FIGS. 1A and 1B.

The structure of extruder of slipform 128 is shown in further detail in FIGS. 5 and 10 where a plurality of extruder sections 128 are joined together for forming a six void plank. The height of the extruders can be varied in order to manufacture planks with varying depths and core sizes. In order to change the size of core or change extruders, the extruder set is disconnected from beams 130 and 132 by disconnecting the bolts 133 shown in FIG. 5.

Figure 11:
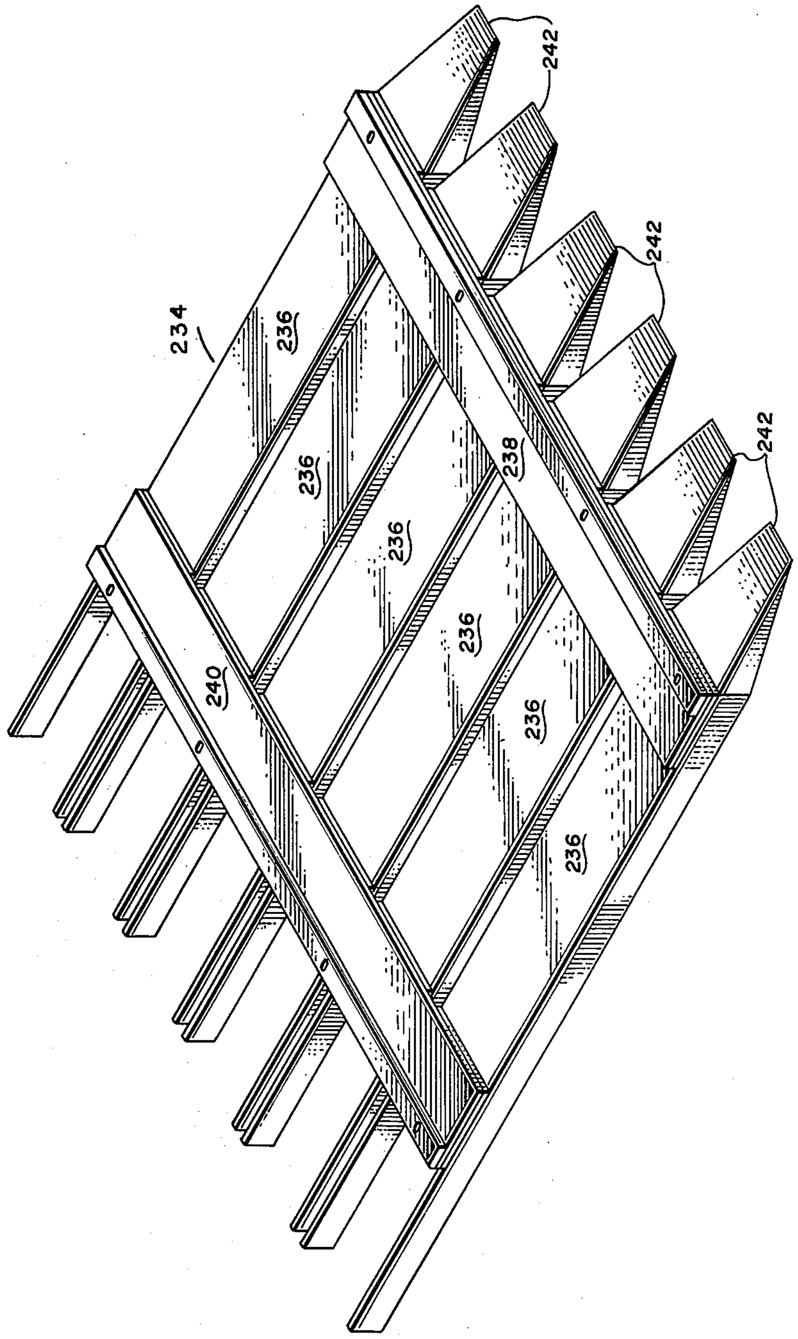
FIG. 11 is an isometric pictorial view of a core forming element in a modified form.
Figures 12, 13, 14:
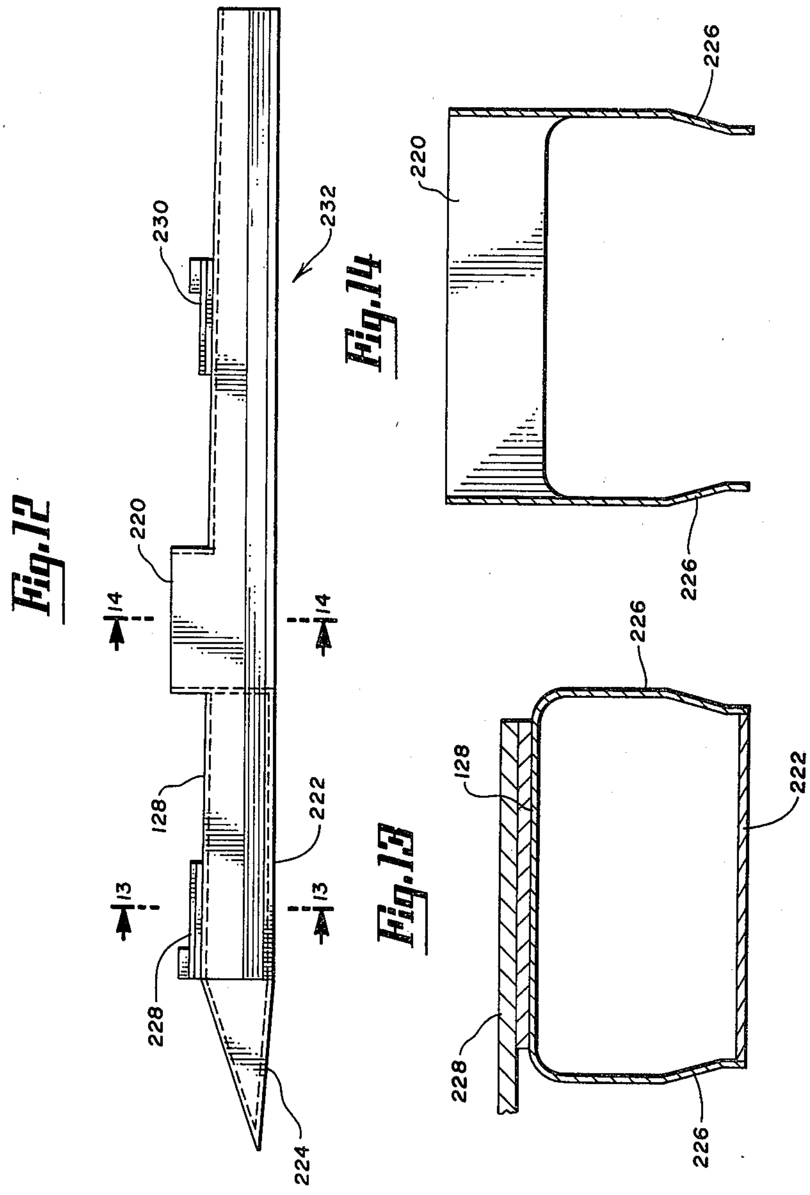
FIG. 12 is a left side elevational view of the core form shown in FIG. 10.
FIG. 13 is a sectional detail in part in elevation and enlarged scale and taken along lines 13—13 of FIG. 12.
FIG. 14 is a sectional detail in part in elevation and enlarged scale and taken along lines 14—14 of FIG. 12.

As generally shown in FIGS. 10 and 12 through 14, each of the extruders 128 has a central, core material receiving opening 220 which communicates with the lower opening of core material hopper 124 to receive a supply of core material therefrom. The portion of the extruder 128 in front of the opening 220 has a closed bottom surface 222, as shown in FIGS. 12 and 13. The extreme front end of the extruder 128 has a wedge shaped plow portion 224 having a reduced cross sectional area. As shown in FIGS. 10 and 11, the parallel side walls 226 of the extruder 128 converge in the wedge shaped front section. Thus, the front of each extruder section 128 acts to form a void by packing concrete deposited from hopper 120, through which the extruder is forced, upwardly, downwardly and to both sides of the extruder tip section 244. The portion of the extruder behind the tip and in front of the core material opening 220 supports the concrete in the shaped configuration to stabilize it. Vibration of the slipform tends to facilitate the packing of the concrete to form well-defined hollow cores which are then filled with core material from the remainder or trailing portion of the slipform.

FIG. 13 shows a section view of the forward portion of the extruder and shows that the side walls 226 of the extruder portions are angled inwardly to cause the machine to form a web between voids in the concrete plank which has a thicker bottom portion to facilitate placing of reinforcing strands in that area, for example. The positioning of prestressing cables, and the application of prestress to the cables and maintenance of the cables under stress during casting and curing, has long been known in the art and is not discussed herein.

The extruder sections 128 are joined together by forward and rear support members 228 and 230. The rear portion of the extruder from the hole 220 through the extreme rear end of the extruder has a completely open bottom to allow the core material to contact the surface of the packed concrete from hopper 120 and to facilitate the flow of the core material from bin 124 into the interior void in the plank formed by the closed forward section of the extruder 128. Vibration of the slipform facilitates the flow of the core material as well as the packing of the concrete and elimination of voids.

The length of the extruder section from the core material hole 220 to the rear edge of the extruder permits core material and concrete voids to stabilize and supports the core opening as additional concrete is poured around the slipform by the rear hopper 122, which dumps its concrete on the tail or trailing portion 232 of the extruder. The tail portion 232 of the extruder has a top surface which tapers downwardly to slightly reduce the cross-sectional area of the void portion to slightly compress or consolidate the core material as it leaves the extruder to form well-defined cores in the product.

The reduction in the height of the extruder from the highest point of the front after the plow 224 to the extreme rear edge of the extruder is between one and three inches for either an eight inch deep or a twelve inch deep product. The height of the core portion of the eight inch product is approximately six inches, while the height of the void in the twelve inch product is approximately ten inches.

Shown in FIG. 11 is an alternate embodiment of the extruder for use in forming eight inch thick solid panels using the casting machine shown. Although no void is formed in the solid panels, it has been found useful to utilize a structure similar to the slipform extruders used to form the hollow core product to aid the packing of the concrete in the concrete form formed by the pallet and side forms. Accordingly, the solid panel "extruder" 234 is made up of a number of sections 236, which are secured together and strengthened by beams 238 and 240. The portion of extruder 234 forward of beam 238 has the same wedge shape 242 characteristic of the extruder section used to form voids in the concrete panels. There is no opening corresponding to opening 220 of the hollow core forming extruder 128 and there is no top surface on the "extruder" 234 to the rear of beam 240. The bottom surface of the extruder 234 is closed from the termination of the plow portion 242 to the beam 240, and the remainder of the extruder which is positioned below hopper 122, is open. Use of extruder 234 facilitates the packing of the concrete around the prestressing cables and assures adequate packing of concrete into the corners between the pallet surface 182 and side form 184.

Whether hollow core or solid product is being cast with the machine, the basic casting steps are generally the same with the exception that core material is not used when solid core panels are being manufactured. As the concrete is delivered from hoppers 120 and 122, the extruder forms a core of core material. The top surface of the plank is depressed and screeded by a screed plate 250, which is pivotally mounted on the rear side of hopper 112. The plate can be adjusted up or down by means of a crank 252 which rotates a threaded rod 254 which passes through a threaded nut attached to a box 256, which is secured to pin 122 by a beam 258. Shaft 254 is pivotally connected to a clevis 260 attached to the back of plate 250. Rotating handle 252 serves to conveniently raise or lower plate 250.

After the plate 250 packs the surface of the concrete, the surface is worked by agitator 264, which is comprised of a shaft 267 into which a plurality of thin rods 269 formed from reinforcing bars are inserted. The shaft 266 is mounted on slide 134 using suitable flanged bearings 271 at both ends of the shaft. A motor 277 drives a worm gear reducer 275 which in turn drives shaft 267. The action of agitator 264 assists in packing the upper surface of the plank and tends to remove air bubble voids in the concrete. The agitator rods 269 pierce the upper surface of the concrete, but do not cut sufficiently into the concrete to reach the core material filled voids.

After the concrete slab passes the agitator 264, its surface is contacted by the front screed 266. The front screed 266 has its height adjusted utilizing a jack screw 268.

After the top surface of the plank is smoothed by the front screed 266, transverse reinforcing bars may be placed in the top surface of the concrete using the steel depresser 270. The steel depressor 270 has a plurality of discs 272 mounted on a rotatable shaft 274. Each disc 272 is aligned with the webs between the voids in the concrete plank as formed by the extruder 128. Shaft 274 is mounted on suitable bearings 276 for free wheeling movement as the plank moves relative to the casting machine. The circumference of disc 272 of the steel depresser 270 is irregular to engage the transverse reinforcing bars and to move them into the proper depth location beneath the surface of the top of the slab. Accordingly, the arcuate circumference of each of the discs 272 must be aligned across the face of depresser 270 to accept a straight reinforcing bar to assist in inserting the bar at the proper depth.

Figures 15, 16, 17:
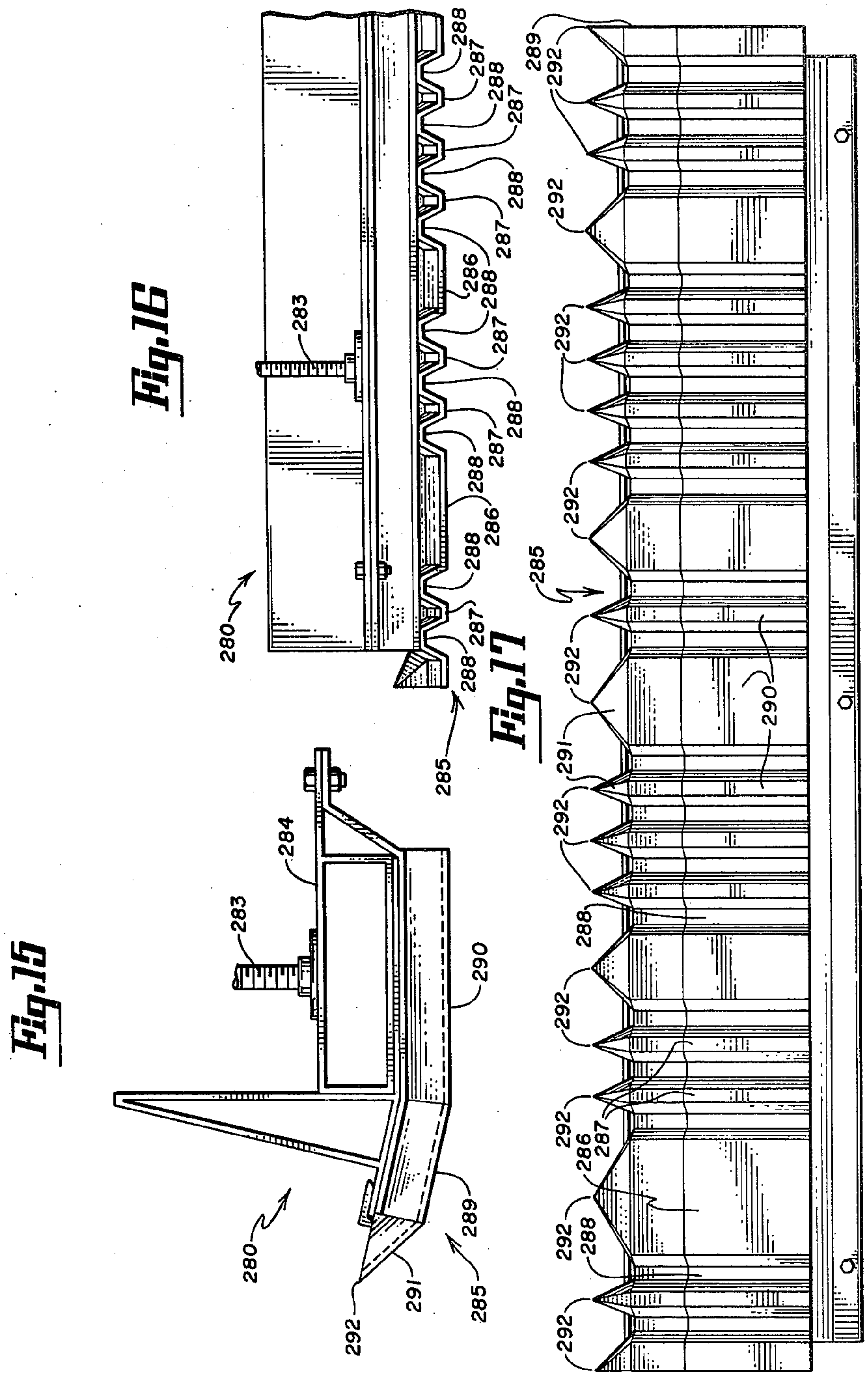
FIG. 15 is a left side elevational view showing detail of the finishing screed shown in FIG. 1B and in enlarged scale.
FIG. 16 is a rear elevational view slightly reduced in scale of the finishing screed of FIG. 15.
FIG. 17 is a bottom plan view of the finishing screed of FIG. 15 and FIG. 16 further reduced in scale.

After the plank passes the steel depresser 270, its surface may again be treated by a rear screed 280. The rear screed 280 can have several different configurations and is utilized to apply a decorative surface finish to a plank or panel. The rear screed 280 is raised or lowered using a jack screw 282 to achieve the proper height. Many different embodiments of rear screeds to achieve different decorative effects are possible. Shown in FIGS. 15 through 17 is a typical screed.

The screed has a threaded support shaft 283 which is raised and lowered by jack screw 282. A frame 284 provides a support and backing for a pattern plate 285 which includes wide projections 286, narrow projections 287 and depressions 288. Such a screed produces a panel surface with a random longitudinal "rib and board" effect. The front portion of plate 285 is angled upwardly from the rear portion 290 of plate 285 and the extreme front portion 291 of each of the projecting areas 286 or 287 is tapered to a reduced cross section area "point" to plow the grooves and depressed areas in the surface of the plank.

The various screeds shown when used with the casting machine disclosed provide excellent longitudinally oriented decorative effects on the top surface of a panel without necessity for utilizing the far more complex surface finishing techniques shown, for example, in Steenson et al Pat. No. 3,775,529.

Figure 19:
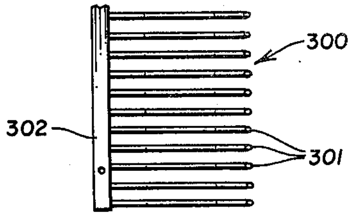
FIG. 19 is a detail plan view of the vibration element shown mounted in FIG. 18.
Figure 18:
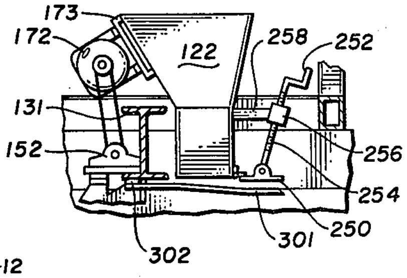
FIG. 18 is a detail in part of FIG. 1A with an optional vibrator attached to the existing elements.

FIG. 19 shows, in side elevational view, an optional vibration element 300 which is comprised of a plurality of tines 301 mounted on a base 302 which is, in turn, mounted on support beams 131 to position tines 301 beneath the second concrete hopper 122 to assure even distribution and mixing of the top layer of concrete when thick concrete panels are being cast.

What is claimed is:

1. A machine for casting concrete panels on a casting pallet, including a floor and a pair of parallel side walls, said machine comprising:

a frame;

a slipform frame having at least one slipform suspended therefrom above the floor and between the side walls of said casting pallet, each of said slipforms having a pair of side walls and a top surface, each of said slipforms having a core shaping material receiving port located in the top surface thereof between front and rear portions thereof, the front portion of each of said slipforms having a closed bottom, while the remainder of said slipform has an open bottom, said slipform also including a closed extreme front portion in which the side walls and top and bottom surfaces of the said slipform are tapered inwardly to form a markedly reduced cross sectional area closed end;

first concrete delivery means mounted on said frame for depositing slump concrete over the front and extreme front portions of each of said slipforms and said casting pallet and covering at least part of said slipform with concrete;

core material delivery means mounted on said frame for delivering crushed rock or similar core material to said core material receiving port on each of said slipforms to fill the rear portion of said slipform with core material;

second concrete delivery means mounted on said frame for depositing slump concrete over the rear portion of said slipform and completely covering the rear portion of said slipform with concrete;

means for introducing relative longitudinal movement between said casting pallet and said frame while said concrete hopper means deposit concrete over each of said slipforms and said core material delivery means delivers core material to the interior of each of said slipforms to continuously form on said casting pallet a concrete panel having at least one core material filled core in a single continuous machine casting operation;

adjustable primary screed means are suspended from said frame for providing a level top surface on said panel; and a rear screed suspended from said frame, said rear screed comprising:

pattern plate means aligned parallel to and adjacent with the top surface of said panel and having a series of projections and depressions at varying depths on the surface thereof aligned along the axis of movement between said casting pallet and said frame; and acutely angled means for plowing connected to the front end of said pattern plate, said means for plowing including a series of projections and depressions aligned with the projections and depressions of said pattern plate with said projection extending forwardly and tapering to a point at the forward end thereof, thereby to facilitate plowing of longitudinal grooves and depressed areas in the surface of said plank corresponding to said projections and depressions.

2. In a machine for casting a concrete panel on a pallet, a finishing screed for applying a decorative longitudinally oriented pattern to the surface of said panel, the improvement comprising:

pattern plate means aligned parallel to and adjacent with the top surface of said panel and having a series of projections and depressions at varying depths on the surface thereof aligned along the axis of movement between said casting pallet and said frame; and acutely angled means for plowing connected to the front end of said pattern plate, said means for plowing including a series of projections and depressions aligned with the projections and depressions of said pattern plate with said projections extending forwardly and tapering to a point at the forward end thereof, thereby to facilitate plowing of longitudinal grooves and depressed areas in the surface of said plank corresponding to said projections and depressions, said plowing means and pattern plate means being constructed and arranged so as to produce a smooth final finish of alternately raised and depressed regions on said concrete panel.

* * * * *